United States Patent [19]

Rademachers et al.

[11] Patent Number: 4,921,542

[45] Date of Patent: May 1, 1990

[54] FINELY DIVIDED IRON OXIDE BLACK PIGMENTS, A PROCESS FOR THEIR PREPARATION AND THEIR USE

[75] Inventors: Jakob Rademachers; Karl-Werner Ganter; Wolfgang Rambold; Günter Linde, all of Krefeld, Fed. Rep. of Germany

[73] Assignee: Bayer Aktiengesellschaft, Leverkusen-Bayerwerk, Fed. Rep. of Germany

[21] Appl. No.: 250,076

[22] Filed: Sep. 28, 1988

[30] Foreign Application Priority Data

Oct. 10, 1987 [DE] Fed. Rep. of Germany ....... 3734342

[51] Int. Cl.$^5$ ............................................. C01G 49/00
[52] U.S. Cl. .................................... 106/456; 106/412; 106/418; 106/439
[58] Field of Search ................. 106/418, 439, 456, 412

[56] References Cited

U.S. PATENT DOCUMENTS

| | | | |
|---|---|---|---|
| 4,090,888 | 5/1978 | Rademachers | 106/439 |
| 4,123,501 | 10/1978 | Kohler | 106/456 |
| 4,631,089 | 12/1986 | Rademachers | 106/456 |
| 4,701,221 | 10/1987 | Brunn | 106/456 |

FOREIGN PATENT DOCUMENTS 1162786 8/1969 United Kingdom .

OTHER PUBLICATIONS

Patent Abstracts of Japan, vol. 9, No. 308, Dec. 1985; "Manufacture of Toner for Electrophotography".

*Primary Examiner*—Peter D. Rosenberg
*Attorney, Agent, or Firm*—Connolly and Hutz

[57] ABSTRACT

Iron oxide black pigments useful as coloring pigments for lacquers and plastics are prepared by an improved process wherein finely divided iron oxide black suspensions obtained from the precipitation processor the aniline process are filtered, washed, dried and ground with the improvement in the process comprising grinding the dried iron oxide pigment in a jet mill with air as the grinding medium and with a water content of from about 1 to 6% by weight based on the iron oxide black pigment input to the process.

10 Claims, 1 Drawing Sheet

FINELY DIVIDED IRON OXIDE BLACK PIGMENTS, A PROCESS FOR THEIR PREPARATION AND THEIR USE

This invention relates to finely divided iron oxide black pigments with a blue-black color tone, to a process for the preparation of these iron oxide black pigments and to their use for coloring substrates.

BACKGROUND OF THE INVENTION

The manufacture of iron oxide black pigments on a technical scale is preferably carried out by one of two processes namely the precipitation process or the aniline process (Ullmanns Encyklopädie der technischen Chemie, 4th Edition 1979, page 603, 1.1.3).

Whereas the aniline process starts with metallic iron which is oxidized to iron oxide by nitrobenzene, the starting materials used for the precipitation process are iron-II salts, mainly chlorides and sulphates. The precipitation process may be carried out either as a one stage process or as a two stage process. In the one stage process, air is introduced into the iron salt solution at an elevated temperature and at pH values from slightly acid to slightly alkaline, whereby the divalent iron is directly oxidized to iron oxide black corresponding to the chemical composition of magnetite $Fe_3O_4$ and precipitated. The two stage process differs from this one stage process in that oxidation is initially carried out in the acid region until the iron has been oxidized to the stage of goethite, $\alpha$-FeOOH, which is then converted into $Fe_3O_4$ with freshly precipitated $Fe(OH)_2$ in an aqueous suspension under the conditions of the one stage process.

The iron oxide black suspensions obtained are filtered to isolate the pigment, thoroughly washed, dried and finally ground.

The fineness of grinding varies according to the intended field of application of the pigment, the main criteria being the screen residue and granularity. When iron oxide black pigments are to be used in the building industry, ordinary grinding in conventional roller mills is sufficient. For use in the lacquer and plastics field, finer grinding is frequently desired.

It is known that for grinding inorganic color pigments, greater size reduction can be achieved by using jet mills due to the greater grinding energies produced. Highly superheated steam is frequently used as grinding medium in jet mills. This type of grinding is generally referred to as micronisation (P. Kresse: defazet-aktuell 26, No. 5, 1972, pages 255–259).

Micronisation by steam jet grinding has hitherto not been employed for iron oxide black pigments because of the risk of oxidation by atmospheric oxygen at the mill outlet, which would adversely affect the color quality of the pigments. Experience has shown that iron oxide black pigments cannot be filled into containers in the presence of air without oxidizing to red iron-III oxide unless the temperatures are distinctly below 100° C. Although cooling under an inert gas atmosphere would conceivably be possible, it would be very expensive and difficult.

It has also become known to grind color pigments by micronisation in jet mills using air as grinding medium but jet milling with air has not hitherto been employed industrially for iron oxide black pigments, evidently because it was feared that the high grinding energy would cause the occurrence of active surfaces (R. Schrader: Technik 24, 1969, 2. pp. 88 to 96 or T. G. Burton: Trans. Instn. chem. Engr. 44, 1966, pp. T 37-T 41) which could readily bring about a reaction of the magnetite with the oxygen of the air.

Although it is known from Japan 60-140263 to employ air jet grinding for the micronisation of magnetic iron oxide black which is used, for example, as toner, the iron oxide is in that case protected against oxidation by covering it with waxes and binders which are in any case required for the finished toner.

In the present state of the art, color pigments consisting of iron oxide black and intended for use in lacquers or plastics are obtained by subjecting them to a more intensive grinding in roller mills using a sharper setting for the classifier. The disadvantages of this method lie in the high cost due to the low pigment throughput which is the result of the high residence time required in the mill.

It is an object of the present invention to provide a process for the preparation of improved finely divided iron oxide black pigments which does not have the disadvantages of the processes described.

BRIEF DESCRIPTION OF THE INVENTION

When iron oxide black pigments were micronised in jet mills using air as grinding medium it was found that, depending on the quantity of water introduced with the material to be ground, pigments with improved color shade and greater color intensity were obtained than in roller mills. It was particularly unexpected to find that there was a positive development of color intensity, although this varied considerably with the quantity of water added in the range of 1 to 6% by weight.

DETAILED DESCRIPTION

Figure 1:
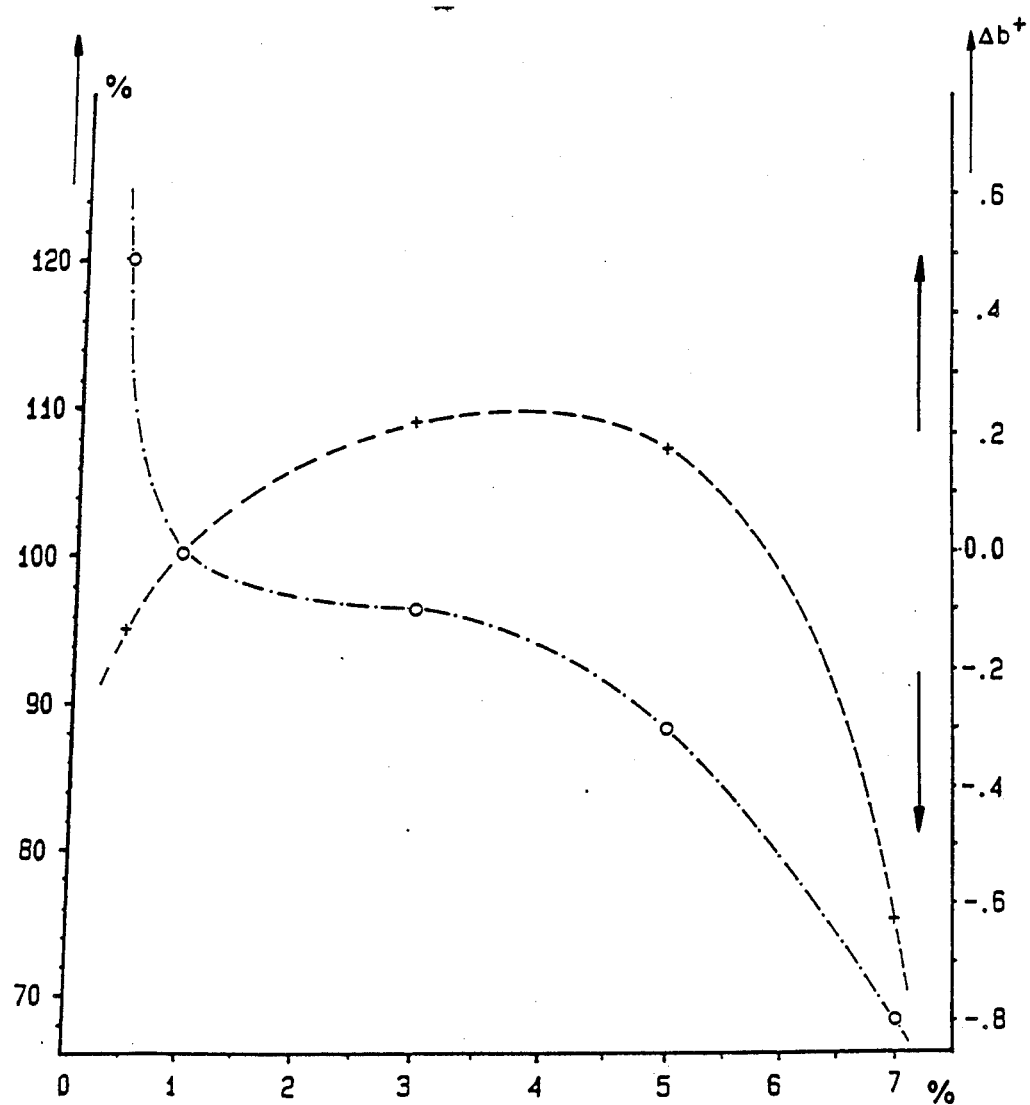
FIG. 1 shows the variation in color intensity (left ordinate) in dependence upon the water content (abscissa) (line-line graph).

This invention relates to an improved process for the preparation of finely divided iron oxide black pigments from iron oxide black suspensions which are obtained by the precipitation process or the aniline process and are then filtered, washed, dried and ground, characterized in that grinding of the dried iron oxide black pigment is carried out in a jet mill using air as grinding medium with a water content of from 1 to 6% by weight, preferably from 3 to 4% by weight, based on the quantity of iron oxide black put into the process.

It has been found that within the range of the quantity of water added according to the invention, which may be introduced into the mill either together with the iron oxide black to be ground or separately, there is a point at which the color intensity obtained is at an optimum. This optimum is reached when the quantity of water added is from 3 to 4% by weight, based on the iron oxide black. An unexpectedly steep drop in color intensity was observed in the region of 0 to 1% by weight and especially at 6 to 7% by weight.

FIG. 1 shows the yellow-blue distance $\Delta b^*$ (right-hand ordinate) in dependence upon the water content (abscissa) (dash-dot graph). Positive $\Delta b^*$ values denote pigments with a brown tinge and negative $\Delta b^*$ values correspond to pigments with a blue tinge.

As will be seen from FIG. 1, the blue tinge increases with the water content, as measured by the yellow-blue distance $\Delta b^*$ in the white blend according to DIN 6174.

It is only when the water content falls below 1% by weight that the pigments obtained have a more pronounced brown tinge than the products obtained by grinding in roller mills.

The quantity of water required in the process according to the invention for a given quality of pigment may advantageously be adjusted at the stage of drying by partial removal of the water.

In a preferred embodiment, the water content is introduced into the mill together with the iron oxide black pigment or separately.

The quantity of air supplied for grinding should be maintained within the range of from 1 to 8 parts by weight, preferably from 3 to 5 parts by weight, based on the iron oxide black to be ground. Lower quantities result in less thorough grinding while higher proportions of air above the range indicated may deleteriously affect the pigment quality. The preliminary pressure of the air should be adjusted to a value from 2 to 12 bar, preferably from 4 to 8 bar.

The grinding process is assisted by grinding auxiliaries from the group of amines, alcohols, carboxylic acids, siloxanes or sulphonates added in quantities of from 0.01 to 0.1% by weight. These substances may be added either together with the water or separately through a second inflow. A wide variety of different constructions of jet mills may be employed, e.g. oval tube jet mills, counter jet mills or spiral jet mills. Spiral jet mills are preferred for grinding iron oxide black pigment. They have a more effective integrated classifier which reduces the tendency of the finely ground particles to cake. The grinding air is introduced through nozzles arranged peripherally. If designed as Laval nozzles, they enable the air to be injected into the grinding chamber at supersonic speed. The ground pigment is easily separated by means of cyclones or filters provided down-stream of the mill.

The following criteria were used for assessing the grinding action:
(1) Screen residue according to DIN 53195 using water as rinsing fluid on a wire screen base of mesh 40 $\mu$m,
(2) granularity according to DIN 53203, using a grindometer according to Hegman; binder used: Alkydal ®-F 681 lacquer (Trade product of Bayer AG),
(3) colorimetric determination of the color distances according to DIN 6174 (CIELAB values), binder: Alkydal ®-F 48 lacquer (Trade Product of Bayer AG),
(4) color intensity according to DIN 55986. White mixture with five times the quantity by weight of the $TiO_2$ pigment Bayertitan ® R-KB 2, binder: Alkydal ®-F 48 lacquer (both Trade products of Bayer AG). Criterion for comparison = brightness.

Compared with ordinary commercial products produced by intensive grinding in roller mills, the iron oxide black pigments obtained by the process according to the invention not only have the color technical advantages mentioned above concerning the color shade and color intensity but also an improved granularity for a given screen residue.

This invention therefore also relates to iron oxide black pigments obtainable by the process according to the invention.

The invention further relates to the use of the iron oxide black pigments according to the invention for coloring lacquers or plastics.

The invention will now be explained with the aid of the following Examples which do not, however, limit the invention.

EXAMPLE 1

20 kg per hour of iron oxide black prepared by the aniline process and having a graininess of about 0.1 to 0.5 mm were supplied to a spiral jet mill which was equipped with 6 nozzles and had an internal diameter of 200 mm and a height of grinding cavity of 20 mm. 13.5 $Nm^3$ of air per hour were required for introduction of the substance through an injector nozzle. The water content of the material to be ground was 5.0% by weight. Air at a preliminary pressure of 8 bar was introduced into the mill at the rate of 33.5 $Nm^3$ per hour through grinding nozzles which had a clear internal diameter of 1.3 mm. The total quantity of air introduced was therefore 60 kg per hour. Examination of the separated ground material showed a screen residue above 40 $\mu$m of 0.001% and a graininess of 30 $\mu$m. A colorimetric assessment in the white blend with the 5-fold quantity by weight of Bayertitan R-KB 2 (Trade product of Bayer AG) carried out by comparison with the conventionally micronised iron oxide black pigment type Bayferrox ® 318 M (Trade pigment of Bayer AG—referred to below as comparison pigment) showed the following color distances: Red-green distance $\Delta a^* = -0.2$ and yellow-blue distance $\Delta b^* = -0.3$. The color of the pigment is a more pronounced bluish black than the pigment used for comparison. The color intensity was 107% of that of the comparison pigment. The screen residue of the comparison pigment was 0.002% by weight and its graininess was 40 $\mu$m.

EXAMPLE 2

Grinding was carried out as in Example 1 with the following modifications: The preliminary air pressure was reduced to 4 bar. The total grinding air was therefore 25 kg per hour for a product throughput rate of 8.3 kg per hour. The water content in the material introduced for grinding was 3.0% by weight and fell to 1.0% by weight in the course of grinding.

Colorimetric assessments in white blend gave a $\Delta a^*$ value of $-0.1$ and a $\Delta b^*$ value of $-0.1$. The pigment therefore has a slightly more pronounced blue tinge than the comparison pigment. The graininess was 30 $\mu$m and the screen residue above 40 $\mu$m was 0.002%. The color intensity was 109%, based on that of the comparison pigment.

EXAMPLE 3

Grinding was carried out as in Example 2 but with the addition of 0.1% by weight of monopropylene glycol. Colorimetric assessment in the white blend gave a $\Delta a^*$ value of $-0.2$, a $\Delta b^*$ value of $-0.7$ and a color intensity of 110% of that of the comparison pigmemnt. The screen residue was 0.001%, the graininess, 25 $\mu$m.

EXAMPLE 4

Grinding was carried out as in Example 2 but with a water content in the unground iron oxide black of 1.0% by weight. The color shade and color intensity of the micronised pigment obtained were in the same range as those of the comparison pigment. The screen residue and graininess were also identical with those of the comparison pigment.

COUNTER EXAMPLE 1

The material to be ground in this case had a water content of 0.5%. The other conditions were the same as those indicated in Example 1. Colorimetric assessment in the white blend showed a $\Delta a^*$ value of $-0.1$ and a $\Delta b^*$ value of $+0.5$. Due to its higher yellow content the product had a more pronounced brown tinge than the comparison pigment. The color intensity was only 95%, the screen residue was 0.002% and the graininess was 40 μm.

COUNTER EXAMPLE 2

The material put into the mill was an iron oxide black which had a water content of 7% by weight. The pigment obtained was found to have a $\Delta a^*$ value of $-0.1$ and a $\Delta b^*$ value of $-0.8$ in the $TiO_2$ blend. The intensity of color was only 75%. The graininess was 45 μm and the screen residue was 0.002%.

What is claimed is:

1. In an improved process for the preparation of finely divided iron oxide black pigments by precipitation from iron oxide black suspensions or the oxidation of metallic iron, then filtered, washed, dried and ground,
   the improvement comprises carrying out the grinding of the dried iron oxide pigment in a jet mill with air as the grinding medium and with a water content of from about 1 to 6% by weight based on the iron oxide black pigment input to the process.

2. An improved process according to claim 1 wherein the water content in the grinding step is 3 to 4% by weight based on the iron oxide black pigment.

3. An improved process according to claim 1 wherein the water and the iron oxide black pigment to be ground are introduced into the mill together or separately.

4. An improved process according to claim 1 wherein the ratio by weight of grinding air to iron oxide to be ground is adjusted to a value from about 1 to 8.

5. An improved process according to claim 4 wherein the air to iron oxide weight ratio is about 3 to 5.

6. An improved process according to claim 1 wherein the preliminary pressure of the grinding air is maintained within the range of from about 2 to 12 bar.

7. An improved process according to claim 6 wherein the preliminary pressure of the grinding air is from about 4 to 8 bar.

8. An improved process according to claim 1 wherein at least one grinding auxiliary selected from the group consisting amines, alcohols, carboxylic acids, siloxanes and sulphonates is added to the iron oxide black pigment.

9. Iron oxide black pigments produced by the process according to claims 1.

10. Colored lacquers or plastics containing as a coloring pigment the iron oxide black pigment according to claim 9.

* * * * *